(12) United States Patent
Ooishi

(10) Patent No.: US 6,243,704 B1
(45) Date of Patent: Jun. 5, 2001

(54) BUSINESS NONSTANDARD CHARACTER PROCESSING APPARATUS AND SYSTEM, AND COMPUTER READABLE STORAGE MEDIUM

(75) Inventor: Isamu Ooishi, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/024,126

(22) Filed: Feb. 17, 1998

(30) Foreign Application Priority Data

Apr. 25, 1997 (JP) .................................................. 9-109876

(51) Int. Cl.[7] .................................................. G06R 17/30
(52) U.S. Cl. .............................. 707/10; 707/1; 707/503; 707/535; 707/536; 707/542
(58) Field of Search .................................. 707/1, 10, 542, 707/535, 536, 503; 705/7; 400/615.2; 709/246, 228; 395/708; 382/270

(56) References Cited

U.S. PATENT DOCUMENTS

| | | | | |
|---|---|---|---|---|
| 3,644,890 | * | 2/1972 | Matthews | 382/270 |
| 5,293,629 | * | 3/1994 | Conley | 395/708 |
| 5,628,010 | * | 5/1997 | Ooishi | 395/601 |
| 5,699,524 | * | 12/1997 | Ooishi | 705/7 |
| 5,802,538 | * | 9/1998 | Ooishi | 707/542 |
| 5,870,723 | * | 2/1999 | Pare, Jr. et al. | 705/39 |
| 5,890,184 | * | 3/1999 | Ooishi | 707/542 |
| 5,892,919 | * | 4/1999 | Nielsen | 709/228 |
| 5,903,861 | * | 5/1999 | Chan | 704/9 |
| 5,907,680 | * | 5/1999 | Nielsen | 709/226 |
| 5,947,619 | * | 9/1999 | Kurashina | 400/615.2 |
| 5,953,541 | * | 9/1999 | King et al. | 395/887 |

OTHER PUBLICATIONS

Understanding Japanese Information Processing by Ken Lunde, ;O'Reilly & Associates, Inc. pp v–xiii, 19–28, 101–110, 112–123, (1993).*

* cited by examiner

Primary Examiner—Thomas Black
Assistant Examiner—Diane D. Mizrahi
(74) Attorney, Agent, or Firm—Staas & Halsey LLP

(57) ABSTRACT

A business nonstandard character processing apparatus includes a plurality of work processing parts for carrying out processes using nonstandard character data registered in a system nonstandard character file, one or a plurality of nonstandard character files provided correspondence with work identification information, and a nonstandard character registration processing part registering as the nonstandard character file a nonstandard character file provided in correspondence with a specified work identification information.

17 Claims, 13 Drawing Sheets

FIG. 4

| WORK IDENTIFICATION NAME | KEIRI |
|---|---|
| RESOURCE ACCESS INFORMATION | //host1.foo.co.jp/xyz/KEIRI/ |

FIG. 5

| NUMBER OF FONTS | 2 |
|---|---|
| FONT IDENTIFICATION NAME | MIN |
| FONT NAME | MINCHO TYPEFACE |
| UPDATED DATE | 97/02/21 |
| DIFFERENCE APPLICABLE DATE | 97/01/15 |
| FONT IDENTIFICATION NAME | GOT |
| FONT NAME | GOTHIC TYPEFACE |
| UPDATED DATE | 97/02/25 |
| DIFFERENCE APPLICABLE DATE | 97/01/17 |

Rows 2–5: (1)
Rows 6–9: (2)

FIG. 6

| | | |
|---|---|---|
| NUMBER OF NONSTANDARD CHARACTERS | 3 | |
| NONSTANDARD CHARACTER CODE | F 0 4 0 | ⎫ |
| NONSTANDARD CHARACTER DATA LENGTH | 2 0 0 | ⎬ (3) |
| NONSTANDARD CHARACTER DATA | | ⎭ |
| NONSTANDARD CHARACTER CODE | F 0 4 1 | ⎫ |
| NONSTANDARD CHARACTER DATA LENGTH | 1 0 0 | ⎬ (4) |
| NONSTANDARD CHARACTER DATA | | ⎭ |
| NONSTANDARD CHARACTER CODE | F 0 4 2 | ⎫ |
| NONSTANDARD CHARACTER DATA LENGTH | 2 4 0 | ⎬ (5) |
| NONSTANDARD CHARACTER DATA | | ⎭ |

BUSINESS NONSTANDARD CHARACTER PROCESSING APPARATUS AND SYSTEM, AND COMPUTER READABLE STORAGE MEDIUM

BACKGROUND OF THE INVENTION

The present invention generally relates to business nonstandard character processing apparatuses and systems and computer readable storage mediums, and more particularly to a business nonstandard character processing apparatus and system which process nonstandard characters for each work which are not predefined, and are suited for application to a computer which is coupled to a network and carries out a plurality of works, and to a computer readable storage medium which stores programs for processing nonstandard characters for each work which are not predefined.

Normally, a character set and a code set which are predefined by a standard or the like when processing characters in a computer. The character set is a set of characters which are processed, and the code set is a set of characters and numbers or character codes assigned to the characters.

A provider of a computer hardware or a provider of an operating system which controls the computer usually provide character fonts in the form of a font random access memory (ROM) or a font file by using some kind of character code as the precondition.

When processing a character which is not defined by the character set, the user of the computer creates his own character font and stores this character font in a file. By registering this file as a nonstandard character file, it becomes possible to use a character which is not defined by the standard.

The need to register nonstandard characters is small in the case of a large computer which is originally designed to process a large number of kinds of characters. For this reason, the number of registrable nonstandard characters does not become a problem in the large computer, and a single large computer can simultaneously process various works.

But recently, the performance of small computers has improved considerably, and there are now demands to carry out on a small computer, such as a personal computer, the work that is conventionally carried out by the large computer. However, in the small computer such as the personal computer, the number of kinds of characters that can be processed is small to start with, and the number of registrable nonstandard characters is not sufficient to enable the small computer to carry out the word of the large computer. For this reason, the small computer can only carry out limited work, and when carrying out a plurality of works on the small computer, the work must be limited to the work that does not process the nonstandard characters.

Furthermore, there are demands to process various kinds of works by connecting the small computer such as the personal computer to a network, and consequently, there are demands to realize a technique for efficiently processing a large amount of nonstandard characters.

SUMMARY OF THE INVENTION

Accordingly, it is a general object of the present invention to provide a novel and useful business nonstandard character processing apparatus in which the problems described above are eliminated.

Another and more specific object of the present invention is to provide a business nonstandard character processing apparatus which assigns work identification information for each work that is processed on a computer, and manges nonstandard character files depending on each work identification information. When transmitting a nonstandard character file from a server which manages the nonstandard characters to a server which carries out the work, only a difference between a previously transmitted nonstandard character file and the present nonstandard character file which is to be transmitted is transmitted, so as to reduce a load on the network.

Still another object of the present invention is to provide a business nonstandard character processing apparatus comprising a plurality of work processing parts carrying out processes using nonstandard character data registered in a system nonstandard character file, one or a plurality of nonstandard character files provided correspondence with work identification information, and a nonstandard character registration processing part registering as the nonstandard character file a nonstandard character file provided in correspondence with a specified work identification information. According to the business nonstandard character processing apparatus of the present invention, it is simply necessary to set up a nonstandard character registration program in a client apparatus, and thereafter, it is possible to correctly display the most recent nonstandard character for each work, without having to be conscious of the nonstandard characters. In addition, since it is possible to switch and use the nonstandard characters for each work, it is essentially possible to use an infinite number of nonstandard characters. Furthermore, because the nonstandard characters need not be registered for each client apparatus, the operation efficiency and operation ease of the client apparatus are improved with respect to the operator who operates the client apparatus. In addition, the load on the network can be reduced by checking the updating of the nonstandard character file and by using the difference nonstandard character transmission file.

A further object of the present invention is to provide a business nonstandard character processing apparatus coupled to a nonstandard character management server apparatus which provides a whole nonstandard character transmission file, a difference nonstandard character transmission file and a distribution management information file, where the whole nonstandard character transmission file stores all of most recent nonstandard character information, the difference nonstandard character transmission file stores a difference of nonstandard character information of one generation before and the most recent nonstandard character information, the distribution management information file stores dates of the most recent nonstandard character information and the nonstandard character information of one generation before, and the business nonstandard character processing apparatus comprises a nonstandard character file provided within the business nonstandard character processing apparatus, and means for updating the nonstandard character file within the business nonstandard character processing apparatus using one of the whole nonstandard character transmission file and the difference nonstandard character transmission file, based on a comparison result of a date of the nonstandard character file within the business nonstandard character processing apparatus and a date stored in the distribution management information file within the nonstandard character management server. According to the business nonstandard character processing apparatus of the present invention, it is simply necessary to set up a nonstandard character registration program in a client apparatus, and thereafter, it is possible to correctly display the most recent nonstandard character for each work, without having to be conscious of the nonstandard characters. In addition, since it is possible to switch and use the nonstandard characters for each work, it is essentially possible to use an infinite number of nonstandard characters. Furthermore, because the nonstandard characters need not be registered for each client apparatus, the operation efficiency and operation ease of the client apparatus are improved with respect to the operator who operates the client apparatus. In addition, the load on the network can be reduced by checking the updating of the nonstandard character file and by using the difference nonstandard character transmission file.

Another object of the present invention is to provide a business nonstandard character processing apparatus coupled to a nonstandard character management server which provides a nonstandard character transmission file and a distribution management information file, where the nonstandard transmission file stores most recent nonstandard character information, the distribution management information file stores a date of the most recent nonstandard character information, and the business nonstandard character processing apparatus comprises a nonstandard character file provided within the business nonstandard character processing apparatus, and means for updating the nonstandard character file of the business nonstandard character processing apparatus using the nonstandard character transmission file when a date of the nonstandard character file of the business nonstandard character processing apparatus and a date stored in the distribution management information file do not match. According to the business nonstandard character processing apparatus of the present invention, it is simply necessary to set up a nonstandard character registration program in a client apparatus, and thereafter, it is possible to correctly display the most recent nonstandard character for each work, without having to be conscious of the nonstandard characters. In addition, since it is possible to switch and use the nonstandard characters for each work, it is essentially possible to use an infinite number of nonstandard characters. Furthermore, because the nonstandard characters need not be registered for each client apparatus, the operation efficiency and operation ease of the client apparatus are improved with respect to the operator who operates the client apparatus. In addition, the load on the network can be reduced by checking the updating of the nonstandard character file and by using the difference nonstandard character transmission file.

Still another object of the present invention is to provide a business nonstandard character processing apparatus comprising downloading means for downloading a nonstandard character file based on work identification information which is specified together with a tag which specifies a nonstandard character file and information related to a storage location of the nonstandard character file, and displaying means for displaying nonstandard characters appearing subsequent to the tag by use of the nonstandard character file which is downloaded by the downloading means. According to the business nonstandard character processing apparatus of the present invention, it is simply necessary to set up a nonstandard character registration program in a client apparatus, and thereafter, it is possible to correctly display the most recent nonstandard character for each work, without having to be conscious of the nonstandard characters. In addition, since it is possible to switch and use the nonstandard characters for each work, it is essentially possible to use an infinite number of nonstandard characters. Furthermore, because the nonstandard characters need not be registered for each client apparatus, the operation efficiency and operation ease of the client apparatus are improved with respect to the operator who operates the client apparatus. In addition, the load on the network can be reduced by checking the updating of the nonstandard character file and by using the difference nonstandard character transmission file.

A further object of the present invention is to provide a business nonstandard character processing system comprising a nonstandard character management server comprising: a whole nonstandard character transmission file storing all of most recent nonstandard character information; a difference nonstandard character transmission file storing a difference of nonstandard character information of one generation before and the most recent nonstandard character information; and a distribution management information file storing dates of the most recent nonstandard character information and the nonstandard character information of one generation before; and a client apparatus, coupled to the nonstandard character management server, comprising: a nonstandard character file provided within the client apparatus; and means for updating the nonstandard character file within the nonstandard character management server using one of the whole nonstandard character transmission file and the difference nonstandard character transmission file, based on a comparison result of a date of the nonstandard character file within the client apparatus and a date stored in the distribution management information file within the nonstandard character management server. According to the business nonstandard character processing system of the present invention, it is simply necessary to set up a nonstandard character registration program in a client apparatus, and thereafter, it is possible to correctly display the most recent nonstandard character for each work, without having to be conscious of the nonstandard characters. In addition, since it is possible to switch and use the nonstandard characters for each work, it is essentially possible to use an infinite number of nonstandard characters. Furthermore, because the nonstandard characters need not be registered for each client apparatus, the operation efficiency and operation ease of the client apparatus are improved with respect to the operator who operates the client apparatus. In addition, the load on the network can be reduced by checking the updating of the nonstandard character file and by using the difference nonstandard character transmission file.

Another object of the present invention is to provide a computer readable storage medium which stores a program readable by a computer, comprising means for causing the computer to carry out processes using nonstandard character data registered in a system nonstandard character file, means for causing the computer to provide one or a plurality of nonstandard character files in correspondence with work identification information, and means for causing the computer to register as the nonstandard character file a nonstandard character file provided in correspondence with a specified work identification information. According to the computer readable storage medium of the present invention, it is simply necessary to set up a nonstandard character registration program in a client apparatus, and thereafter, it is possible to correctly display the most recent nonstandard character for each work, without having to be conscious of the nonstandard characters. In addition, since it is possible to switch and use the nonstandard characters for each work, it is essentially possible to use an infinite number of nonstandard characters. Furthermore, because the nonstandard characters need not be registered for each client apparatus, the operation efficiency and operation ease of the client apparatus are improved with respect to the operator who operates the client apparatus. In addition, the load on the network can be reduced by checking the updating of the nonstandard character file and by using the difference nonstandard character transmission file.

Still another object of the present invention is to provide a computer readable storage medium storing a program readable by a computer which is coupled to a nonstandard character management server apparatus which provides a whole nonstandard character transmission file, a difference nonstandard character transmission file and a distribution management information file, where the whole nonstandard character transmission file store all of most recent nonstandard character information, the difference nonstandard character transmission file stores a difference of nonstandard character information of one generation before and the most recent nonstandard character information, the distribution management information file stores dates of the most recent nonstandard character information and the nonstandard character information of one generation before, and the computer readable storage medium comprises means for causing the computer to provide a nonstandard character file, and means for causing the computer to update the nonstandard character file within the computer readable storage medium using one of the whole nonstandard character transmission file and the difference nonstandard character transmission file, based on a comparison result of a date of the nonstandard character file within the computer readable storage medium and a date stored in the distribution management information file within the nonstandard character management server. According to the computer readable storage medium of the present invention, it is simply necessary to set up a nonstandard character registration program in a client apparatus, and thereafter, it is possible to correctly display the most recent nonstandard character for each work, without having to be conscious of the nonstandard characters. In addition, since it is possible to switch and use the nonstandard characters for each work, it is essentially possible to use an infinite number of nonstandard characters. Furthermore, because the nonstandard characters need not be registered for each client apparatus, the operation efficiency and operation ease of the client apparatus are improved with respect to the operator who operates the client apparatus. In addition, the load on the network can be reduced by checking the updating of the nonstandard character file and by using the difference nonstandard character transmission file.

A further object of the present invention is to provide a computer readable storage medium storing a program readable by a computer which is coupled to a nonstandard character management server which provides a nonstandard character transmission file and a distribution management information file, where the nonstandard transmission file stores most recent nonstandard character information, the distribution management information file stores a date of the most recent nonstandard character information, and the computer readable storage medium comprises means for causing the computer to provide a nonstandard character file, and means for causing the computer to update the nonstandard character file of the computer readable storage medium using the nonstandard character transmission file when a date of the nonstandard character file of the computer readable storage medium and a date stored in the distribution management information file do not match. According to the computer readable storage medium of the present invention, it is simply necessary to set up a nonstandard character registration program in a client apparatus, and thereafter, it is possible to correctly display the most recent nonstandard character for each work, without having to be conscious of the nonstandard characters. In addition, since it is possible to switch and use the nonstandard characters for each work, it is essentially possible to use an infinite number of nonstandard characters. Furthermore, because the nonstandard characters need not be registered for each client apparatus, the operation efficiency and operation ease of the client apparatus are improved with respect to the operator who operates the client apparatus. In addition, the load on the network can be reduced by checking the updating of the nonstandard character file and by using the difference nonstandard character transmission file.

Another object of the present invention is to provide a computer readable storage medium storing a program readable by a computer, comprising downloading means for causing the computer to download a nonstandard character file based on work identification information which is specified together with a tag which specifies a nonstandard character file and information related to a storage location of the nonstandard character file, and displaying means for causing the computer to display nonstandard characters appearing subsequent to the tag by use of the nonstandard character file which is downloaded by the downloading means. According to the computer readable storage medium of the present invention, it is simply necessary to set up a nonstandard character registration program in a client apparatus, and thereafter, it is possible to correctly display the most recent nonstandard character for each work, without having to be conscious of the nonstandard characters. In addition, since it is possible to switch and use the nonstandard characters for each work, it is essentially possible to use an infinite number of nonstandard characters. Furthermore, because the nonstandard characters need not be registered for each client apparatus, the operation efficiency and operation ease of the client apparatus are improved with respect to the operator who operates the client apparatus. In addition, the load on the network can be reduced by checking the updating of the nonstandard character file and by using the difference nonstandard character transmission file.

Other objects and further features of the present invention will be apparent from the following detailed description when read in conjunction with the accompanying drawings.

BRIEF DESCRIPTION OF THE DRAWINGS

FIG. 4 is a diagram showing the structure of a start information file;

FIG. 5 is a diagram showing the structure of a distribution management information file;

FIG. 6 is a diagram showing the structure of a nonstandard character management file;

DESCRIPTION OF THE PREFERRED EMBODIMENTS

Figure 1:
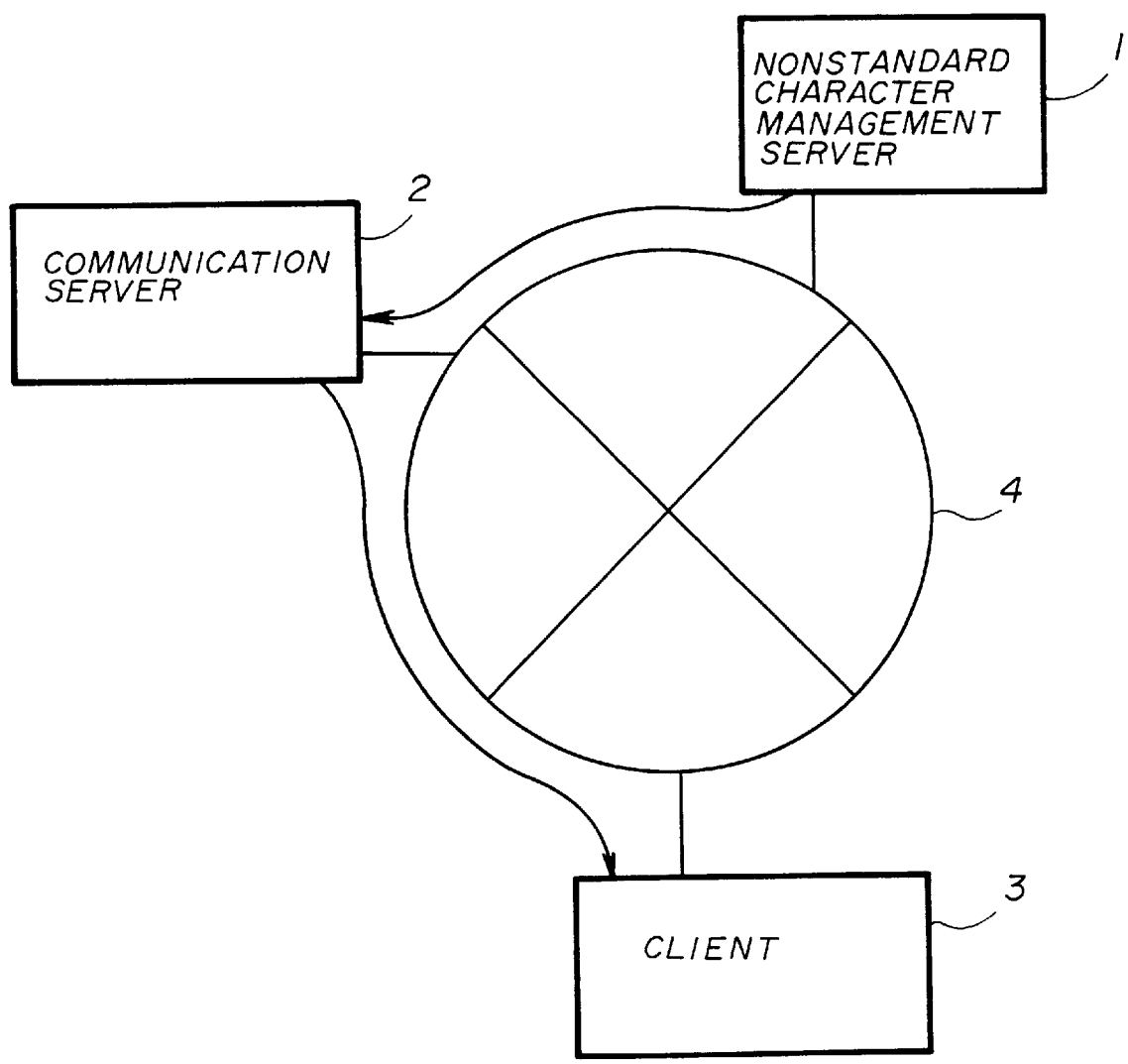
FIG. 1 is a system block diagram showing the basic construction of an embodiment of a business nonstandard character processing system according to the present invention.

FIG. 1 is a system block diagram showing the basic construction of an embodiment of a business nonstandard character processing system according to the present invention. This embodiment of the business nonstandard character processing system employs an embodiment of a business nonstandard character processing apparatus according to the present invention. Further, this embodiment of the business nonstandard character processing apparatus uses an embodiment of a computer readable storage medium according to the present invention.

In this embodiment of the business nonstandard character processing system, a nonstandard character management server 1, a communication server 2, and a client 3 are coupled to a network 4 as shown in FIG. 1. Basically, the nonstandard character management server 1, the communication server 2 and the client 3 may be realized by a known computer having the same construction.

Figure 2:
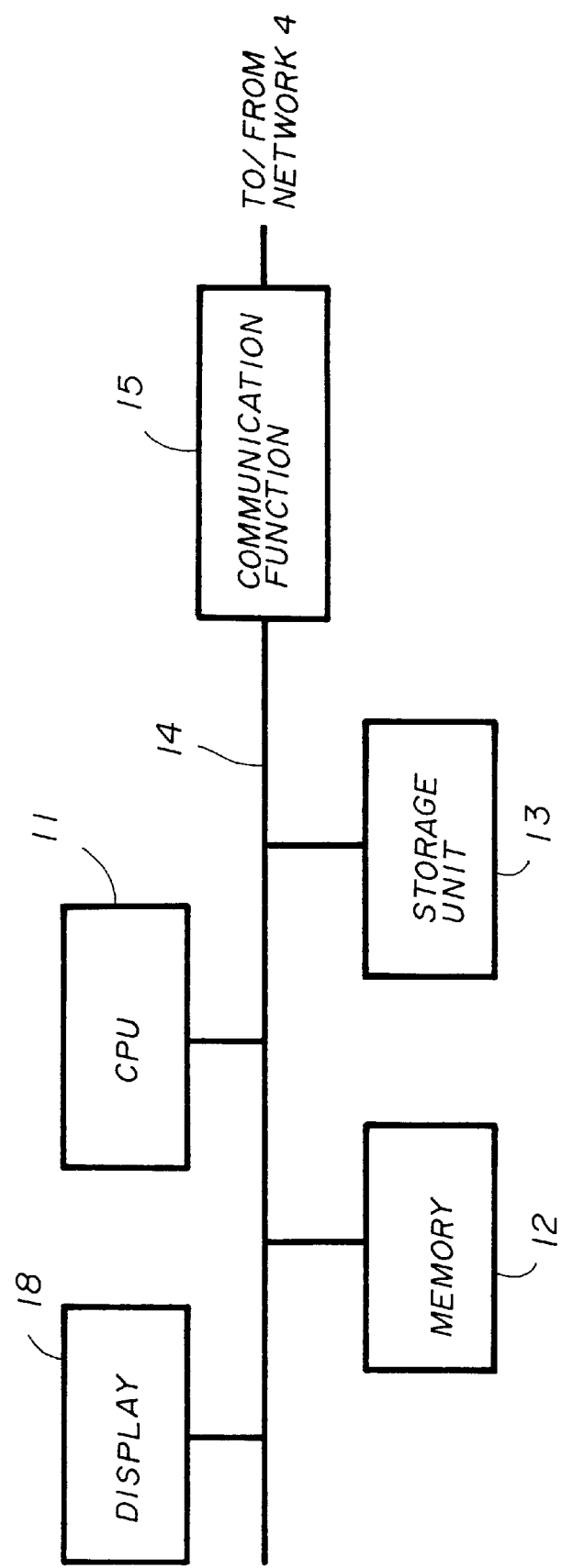
FIG. 2 is a system block diagram showing the basic construction of a computer which may be used as a server or client.

FIG. 2 is a system block diagram showing the basic construction of a computer which may be used as any of the nonstandard character management server 1, the communication server 2 and the client 3. In other words, the embodiment of the business nonstandard character processing apparatus may be realized by the computer shown in FIG. 2.

As shown in FIG. 2, the computer generally includes a central processing unit (CPU) 11, a memory 12, an external storage unit 13 and a display unit 18 which are coupled via a bus 14, and a communication function 15 which is coupled to the bus 14. The CPU 11 controls the general operation of the computer, and programs which are executed by the CPU 11 are stored in the memory 12 and/or the external storage unit 13. The memory 12 also stores data including intermediate data which are obtained during operations carried out by the CPU 11. The memory 12 and the external storage unit 13 are not limited to specific kinds or types of memories and storage units, and various semiconductor devices, disk units such as magnetic, optical and magneto-optic disk units, and other mediums suitable for storing information may be used. The communication function 15 has a function of communicating via the network 4.

In this embodiment, the computer readable storage medium is made up of the external storage unit 13 and/or the memory 12.

Returning to the description of FIG. 1, the nonstandard character management server 1 manages nonstandard characters in the form of nonstandard character management files for every work and for every font, and registers contents of the nonstandard character files in the communication server 2 as nonstandard character transmission files. The communication server 2 transmits the nonstandard character transmission file to the client 3 in response to a request from the client 3 specifying the work. The client 3 specifies a work identification name and requests the nonstandard character file to the communication server 2, and stores and manages the received nonstandard character transmission file within the client 3. In addition, the client 3 registers the received nonstandard character transmission file as a system nonstandard character file of this client 3, so as to make it possible to use the nonstandard characters, and carries out a work process.

Figure 3:
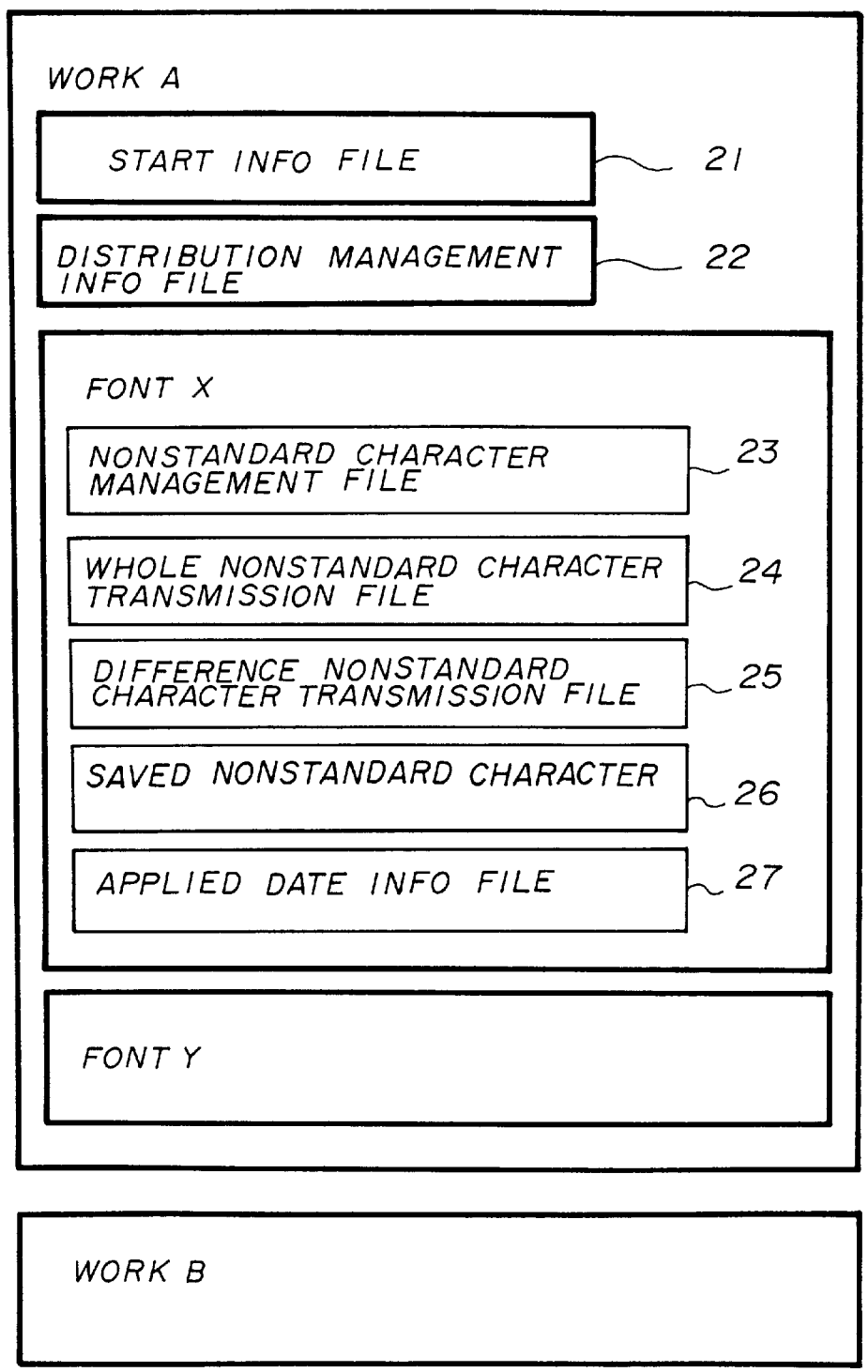
FIG. 3 is a diagram showing files which are processed in the embodiment.

Next, a description will be given of a file which is processed in this embodiment, by referring to FIG. 3. FIG. 3 is a diagram showing the files which are processed in this embodiment. FIG. 3 shows the files with respect to a work A and a work B, where files with respect to a font X and a font Y are provided with respect to the work A.

A start information file 21 shown in FIG. 3 is prepared for each work that is processed by the client 3. With respect to a nonstandard character management program which is executed by the client 3, the start information file 21 specifies a location of a nonstandard character file that is used by a certain work. FIG. 4 is a diagram showing the structure of the start information file 21. In the case shown in FIG. 4, the start information file 21 indicates that a nonstandard character file that is used by a work having a work name "KEIRI" is stored in a directory having a name "/xyz/KEIRI" of a communication server called "hostl.foo-.co.jp". The file name of the start information file 21 has a specific extender added to the work name. In this case, the file name of the start information file 21 is "KEIRI.DEF". The start information file 21 is created by the nonstandard character management server 1 and is registered in the communication server 2. The client 3 obtains the start information file 21 from the communication server 2, and a reference is made to the start information file 21 by the nonstandard character management program which is executed by the client 3.

A distribution management information file 22 shown in FIG. 3 is created for each work, and manages a number of fonts used by the work, and also manages for each font a font identification name, a font name, an updated date and a difference applicable date. FIG. 5 is a diagram showing the structure of the distribution management information file 22. In the case shown in FIG. 5, the number of fonts is "2", and the font information of the two fonts is indicated by "(1)" and "(2)". The distribution management information file 22 is created by the nonstandard character management server 1 and is registered in the communication server 2. The client 3 obtains the distribution management information file 22 from the communication server 2, and a reference is made to the distribution management information file 22 by the nonstandard character management program which is executed by the client 3.

A nonstandard character management file 23 is created for each work and for each font by the nonstandard character management server 1. This nonstandard character management file 23 manages a number of nonstandard characters used in the font that is used by the work, and also manages for each nonstandard character a nonstandard character code assigned to each nonstandard character, a nonstandard character data length and nonstandard character data defining the nonstandard character. FIG. 6 is a diagram showing the structure of the nonstandard character management file 23. In the case shown in FIG. 6, the number of nonstandard characters is "3", and the information for each nonstandard character is indicated by "(3)", "(4)" and "(5)". Of course, the number of nonstandard characters is "3" in FIG. 6 so as to simplify the description, and the actual number of nonstandard characters is much larger than "3". For example, the actual number of nonstandard characters registered in the nonstandard character management file 23 is "1880".

A whole nonstandard character transmission file 24, a difference nonstandard character transmission file 25 and a saved nonstandard character management file 26 shown in FIG. 3 respectively store information using the same structure as the nonstandard character management file 23 described above.

The nonstandard character file of the client 3 has a file name which uses the word identification name and the font identification name as portions of the file name, in order to distinguish the works using the nonstandard character file and the fonts of the nonstandard characters. For example, the file name of a nonstandard character file having a work identification name "KEIRI" and a font identification name "MIN" is "KEIRI_MIN.FNT", where the font identification name "MIN" indicates a Mincho typeface.

Figure 7:
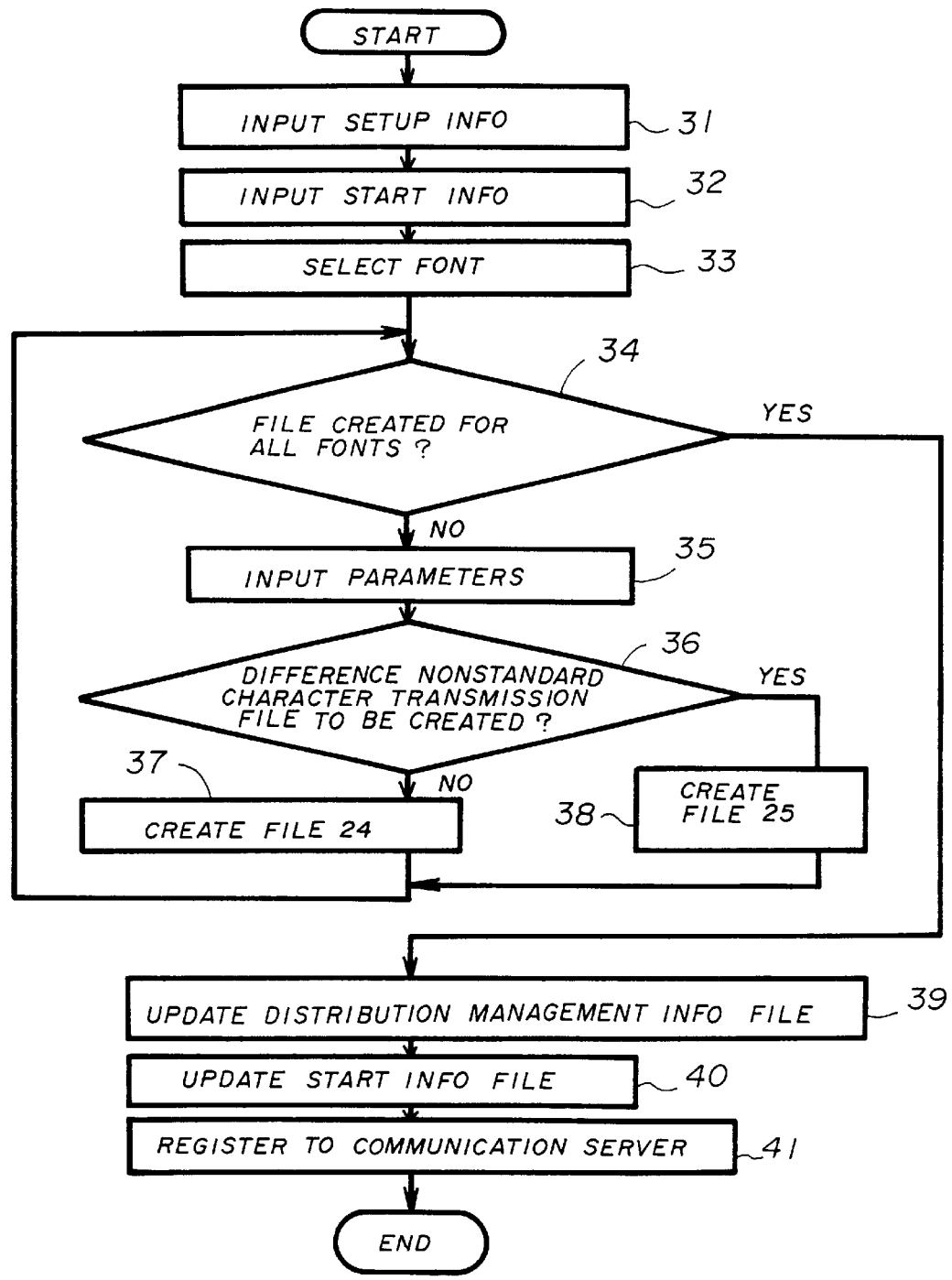
FIG. 7 is a flow chart for explaining the operation of a nonstandard character management server.

Next, a description will be given of the operation of the nonstandard character management server 1, by referring to FIG. 7. In FIG. 7, a step 31 inputs setup information. The setup information is necessary when storing resources in the communication server 2, and includes storage directory and address information of the communication server 2.

Then, a step 32 inputs information that is stored in a start information file of a nonstandard character registration program, which is referred to by a nonstandard character registration program which is executed by the client 3. In this case, the step 32 inputs a work identification name and resource storage location information (URL). For example, the input work identification name is "KEIRI", and the input resource storage location information is "//hostl.foo.co.jp/xyz/KEIRI/", where "hostl.foo.co.jp" indicates the name of the communication server 2, and "/xyz/KEIRI/" indicates the directory name within the communication server 2.

A step 33 specifies one or a plurality of fonts to be used by the work, and creates a nonstandard character transmission file with respect to each specified font by carrying out the following process.

First, a step 34 decides whether or not a file creation is ended with respect to all of the fonts, and the process advances to a step 39 which will be described later if the decision result in the step 34 is YES. On the other hand, if the decision result in the step 34 is NO, a step 35 inputs parameters related to character codes which are allocated for the nonstandard characters. A step 36 decides whether or not a difference nonstandard character transmission file 25 is to be created. If the decision result in the step 36 is NO, a step 37 creates a whole nonstandard character transmission file 24, and the process returns to the step 34. On the other hand, if the decision result in the step 36 is YES, a step 38 creates a difference nonstandard character transmission file 25, and the process returns to the step 34.

In other words, whether only the whole nonstandard character transmission file 24 is to be created or, both the whole nonstandard character transmission file 24 and the difference nonstandard character transmission file 25 are to be created, is specified first. Normally, when creating a nonstandard character transmission file of a certain work and a certain font is created for the first time, only the whole nonstandard character transmission file 24 is created, and both the whole nonstandard character transmission file 24 and the difference nonstandard character file 25 are created the second time and after. However, there are of course cases where only the whole nonstandard character transmission file 24 is created even when the nonstandard character transmission file of the certain work and the certain font for the second or subsequent times.

In addition, a code to be distributed is specified next. In this embodiment, the character codes allocated for the nonstandard characters at the client 3 is within a range of 0xF040 to 0xF9FC amounting to 1880 characters, for example. In a case where the creation of only the whole nonstandard character transmission file 24 is specified, the above described range is automatically selected. On the other hand, if the creation of both the whole nonstandard character transmission file 24 and the difference nonstandard character file 25 is specified, a range which includes the character codes allocated for the nonstandard characters to be stored in the difference nonstandard character file 25 is specified.

Furthermore, the nonstandard character transmission file is created based on the specified conditions. The creation of the nonstandard character transmission file will be described later in more detail with reference to FIGS. 8 and 9.

The above described process is repeated for each font, and when the creation of the nonstandard character transmission file is completed for all of the fonts, the decision result in the step 34 becomes YES, and the process advances to the step 39.

The step 39 updates the distribution management information file 22, and a step 40 updates the start information file 21. More particularly, the step 39 sets in the distribution management information file 22 the font name of the distributing font, the font identification name, a distribution data of the whole nonstandard character for each font, and the applicable subject date of the difference nonstandard character for each font. In addition, the step 40 sets in the start information file 21 of the nonstandard character registration program the work identification name and the resource storage location information (URL).

When the above described settings in the steps 39 and 40 are completed, a step 41 start communicating with the communication server 2 based on the setup information which is first input by the step 31. In addition, the step 41 registers at the resource storage location in the communication server 2 the whole nonstandard character transmission file 24 and the difference nonstandard character transmission file 25 respectively amounting to the number of fonts, the distribution management information file 22, and the start information file 21 of the nonstandard character registration program, and the process ends.

Figure 8:
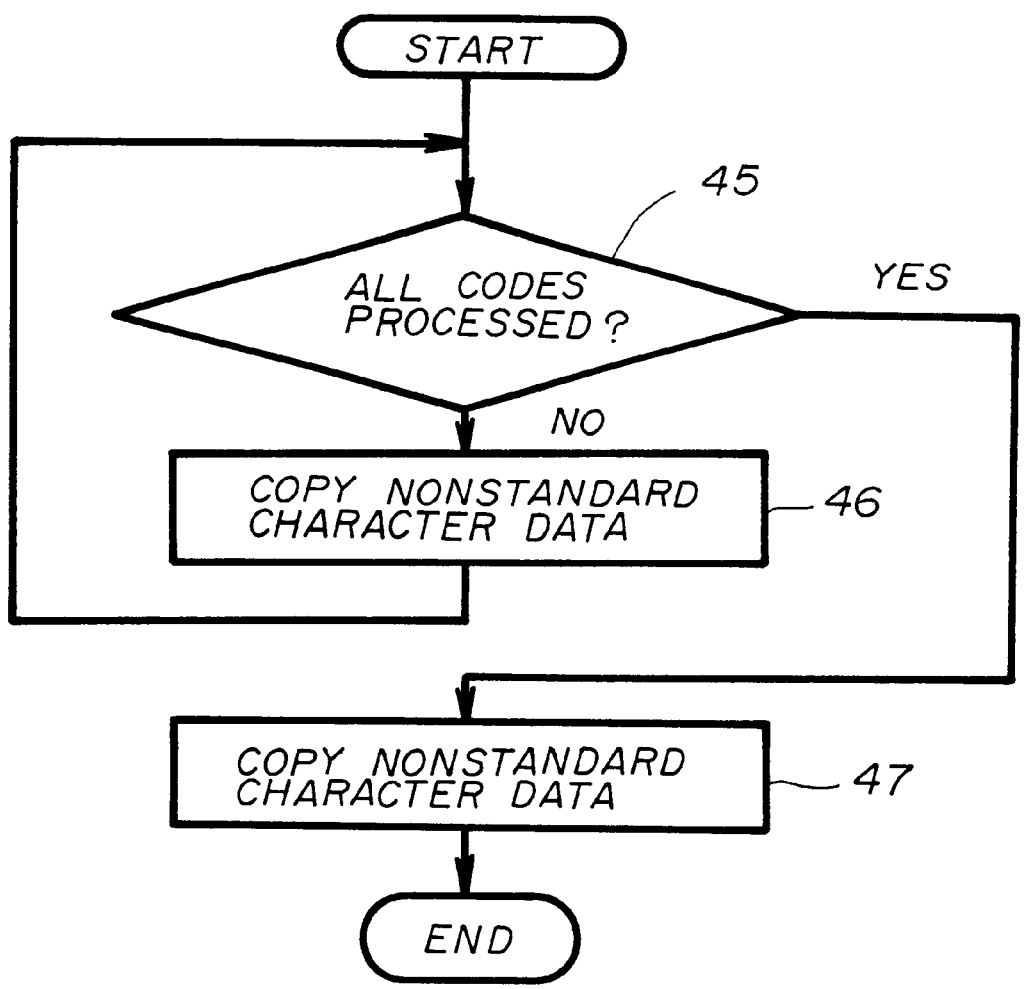
FIG. 8 is a flow chart for explaining a general nonstandard character transmission file creating process.

Next, a description will be given of a procedure with which the whole nonstandard character transmission file 24 is created, by referring to FIG. 8. FIG. 8 is a flow chart for explaining a general nonstandard character transmission file creating process.

As shown in FIG. 8, a step 45 decides whether or not all character codes are processed. If the decision result in the step 45 is NO, a step 46 reads the nonstandard character data from the nonstandard character management file 23 with respect to all of the character codes registered within the nonstandard character management file 23, and writes the read nonstandard character data in the whole nonstandard character transmission file 24. The process returns to the step 45 after the step 46. On the other hand, if the decision result in the step 45 is YES, a step 47 copies the contents of the whole nonstandard character transmission file 24 in the saved nonstandard character management file 26, and the process ends. The saved nonstandard character management file 26 is used when next carrying out a process of creating the difference nonstandard character transmission file 25.

Figure 9:
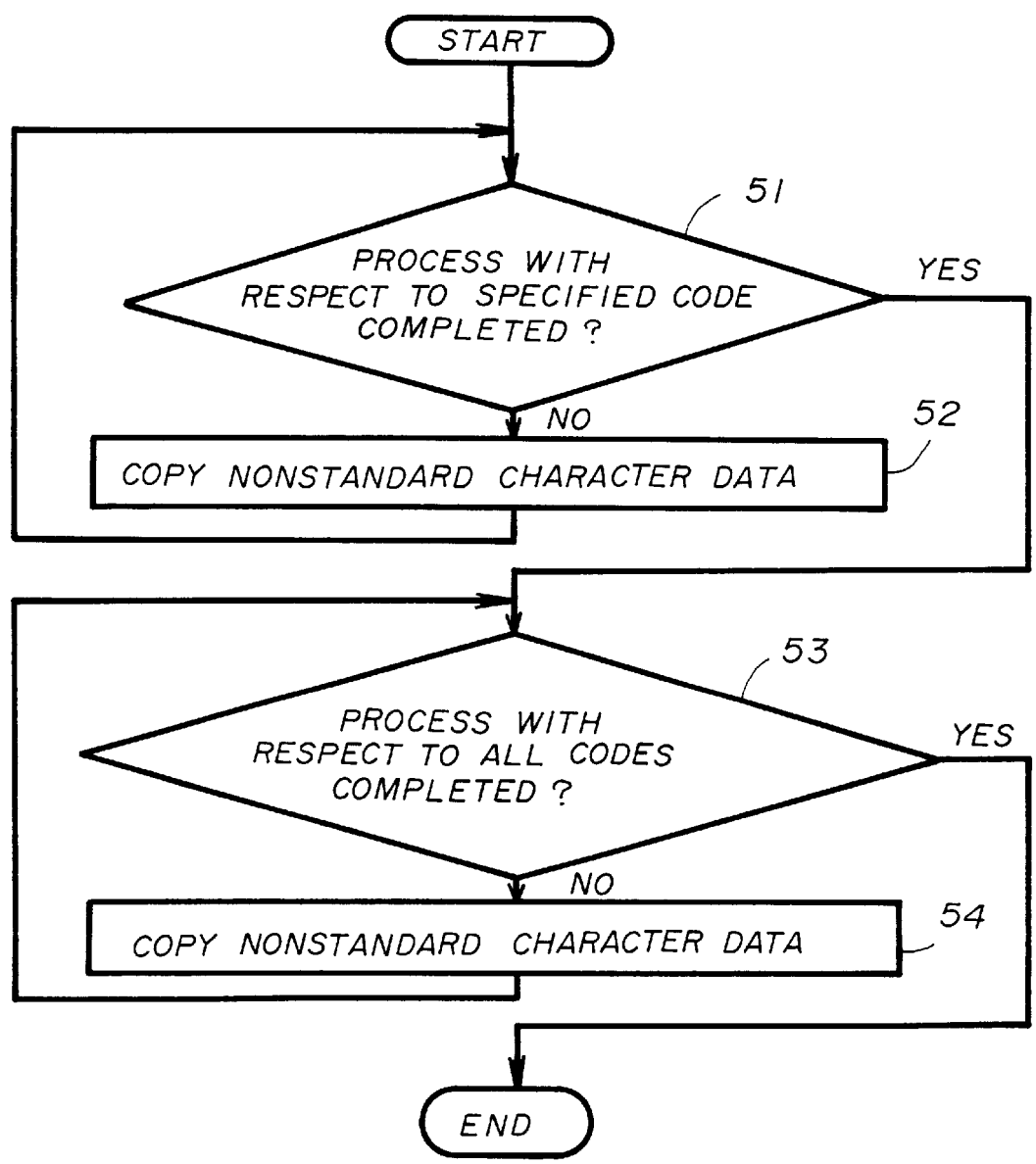
FIG. 9 is a flow chart for explaining a difference nonstandard character transmission file creating process.

Next, a description will be given of a procedure with which both the whole nonstandard character transmission file 24 and the difference nonstandard character transmission file 25 are created, by referring to FIG. 9. FIG. 9 is a flow chart for explaining a difference nonstandard character transmission file creating process.

In FIG. 9, a step 51 decides whether or not a process with respect to a specified nonstandard character code is completed. If the decision result in the step 51 is NO, a step 52 copies the nonstandard character data from the nonstandard character management file 23 to the difference nonstandard character transmission file 25 and updates the existing saved nonstandard character management file 26. The process returns to the step 51 after the step 52.

In other words, first, the creation of the difference nonstandard character transmission file 25 and the updating of the saved nonstandard character management file 26 are carried out simultaneously. With respect to the nonstandard character code specified in the step 35 shown in FIG. 7, the step 52 reads the nonstandard character data from the nonstandard character management file 23 and writes the read nonstandard character data into the difference nonstandard character transmission file 25, and updates the existing saved nonstandard character management file 26.

When the process with respect to all of the specified nonstandard character codes is completed and the decision result in the step 51 is YES, the process advances to a step 53 so as to start creation of the whole nonstandard character transmission file 24. The step 53 decides whether or not the process is completed with respect to all of the nonstandard character codes, that is, with respect to the character codes amounting to 1880 nonstandard characters, and the process ends if the decision result in the step 53 is YES. On the other hand, if the decision result in the step 53 is NO, a step 54 copies the nonstandard character data of each of the nonstandard characters from the saved nonstandard character management file 26 to the whole nonstandard character transmission file 24, and the process returns to the step 53.

Next, a description will be given of the operation of the communication server 2. The communication server 2 accepts two kinds of request from the client 3, that is, the setup request and the nonstandard character registration request from the client 3.

Figure 10:
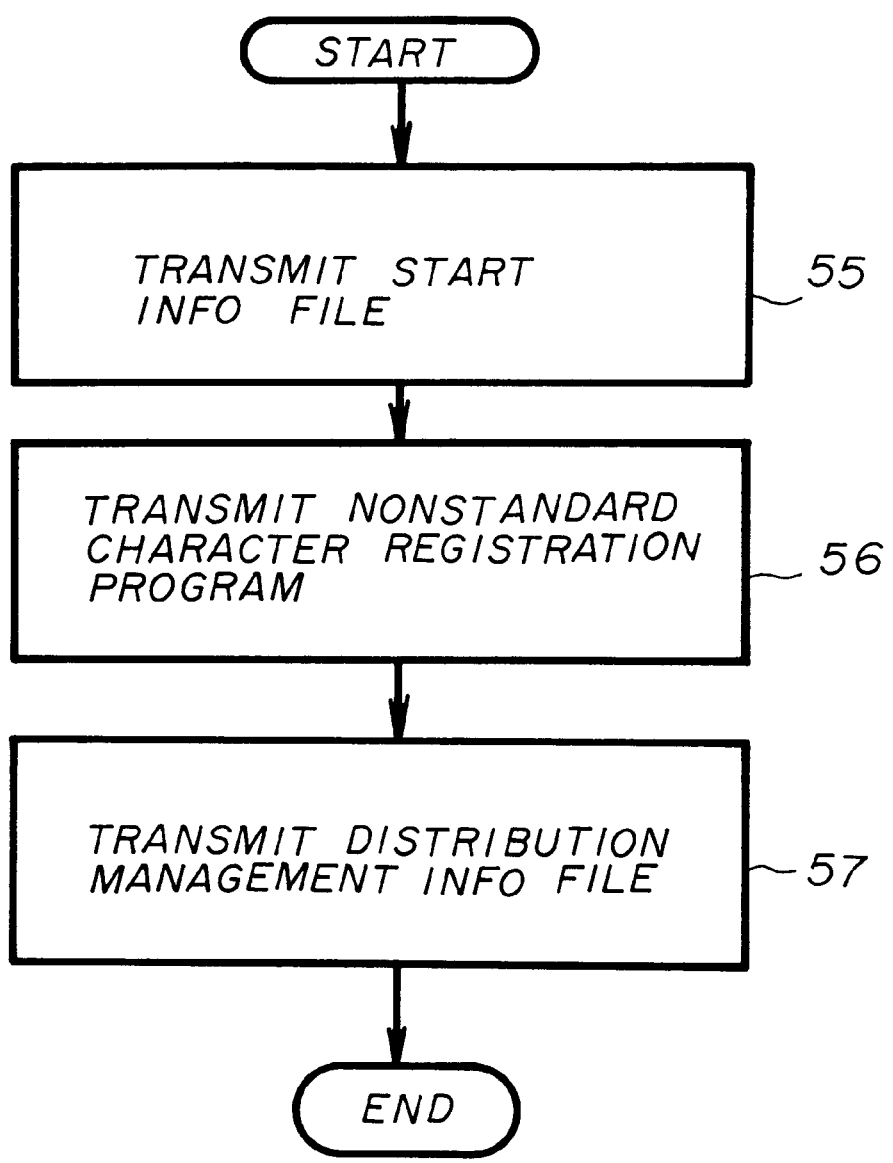
FIG. 10 is a flow chart for explaining the operation of a communication server with respect to a setup request from a client.

A description will be given of the operation of the communication server 2 for a case where the setup request is accepted, by referring to FIG. 10. FIG. 10 is a flow chart for explaining the operation of the communication server 2 with respect to the setup request from the client 3.

In FIG. 10, a step 55 transmits to the client 3 the start information file 21 of the nonstandard character registration program of the client 3. A step 56 transmits the nonstandard character registration program to the client 3. Finally, a step 57 transmits the distribution management information file 22 to the client 3, and the process that is carried out when the setup request from the client 3 ends.

Figure 11:
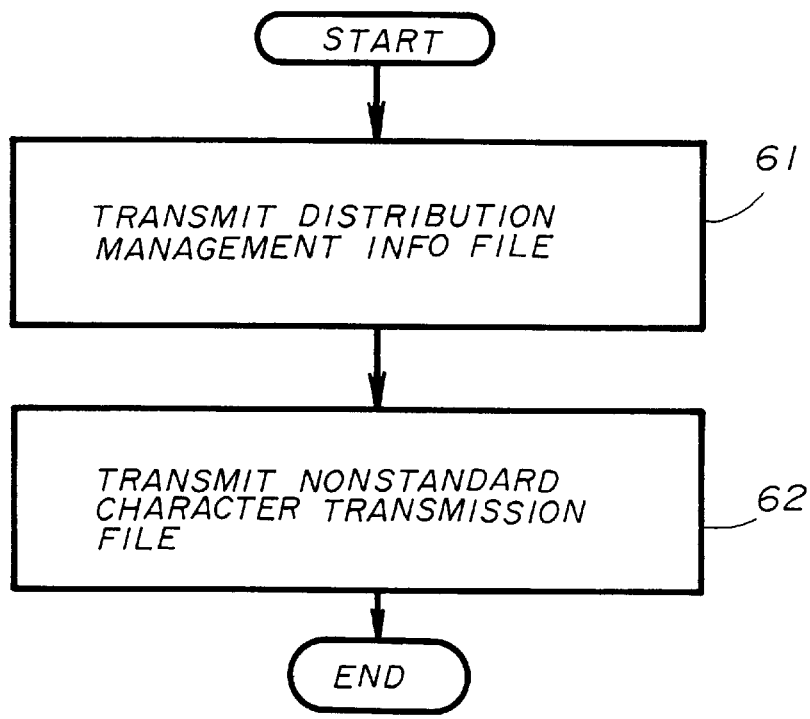
FIG. 11 is a flow chart for explaining the operation of the communication server with respect to a nonstandard character registration process from the client.

Next, a description will be given of the operation of the communication server 2 for a case where the nonstandard character registration request is accepted, by referring to FIG. 11. FIG. 11 is a flow chart for explaining the operation of the communication server 2 with respect to the nonstandard character registration request from the client 3.

In FIG. 11, a step 61 transmits the distribution management information file 22 corresponding to the specified work to the client 3. Then, a step 62 transmits to the client 3 the whole nonstandard character transmission file 24 or the difference nonstandard character transmission file 5, based on the instruction from the client 3, and the process ends.

Next, a description will be given of the operation of the client 3. The client 3 carries out a nonstandard character management process or a setup process of the nonstandard character registration process. The nonstandard character management process includes starting of an application program.

Figure 12:
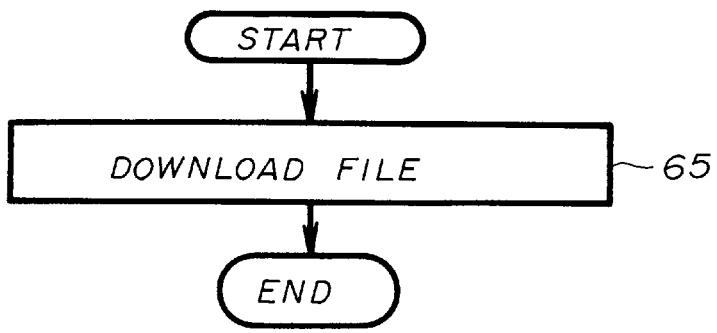
FIG. 12 is a flow chart for explaining a setup process of the client.

A description will be given of the setup process of the nonstandard character registration process, by referring to FIG. 12. FIG. 12 is a flow chart for explaining the setup process of the client 3. In FIG. 12, a step 65 downloads the necessary file. More particularly, the nonstandard character registration program file, the start information file 21 of the nonstandard character registration program and the distribution management information file 22 are downloaded from the communication server 2, and the process ends.

Figure 13:
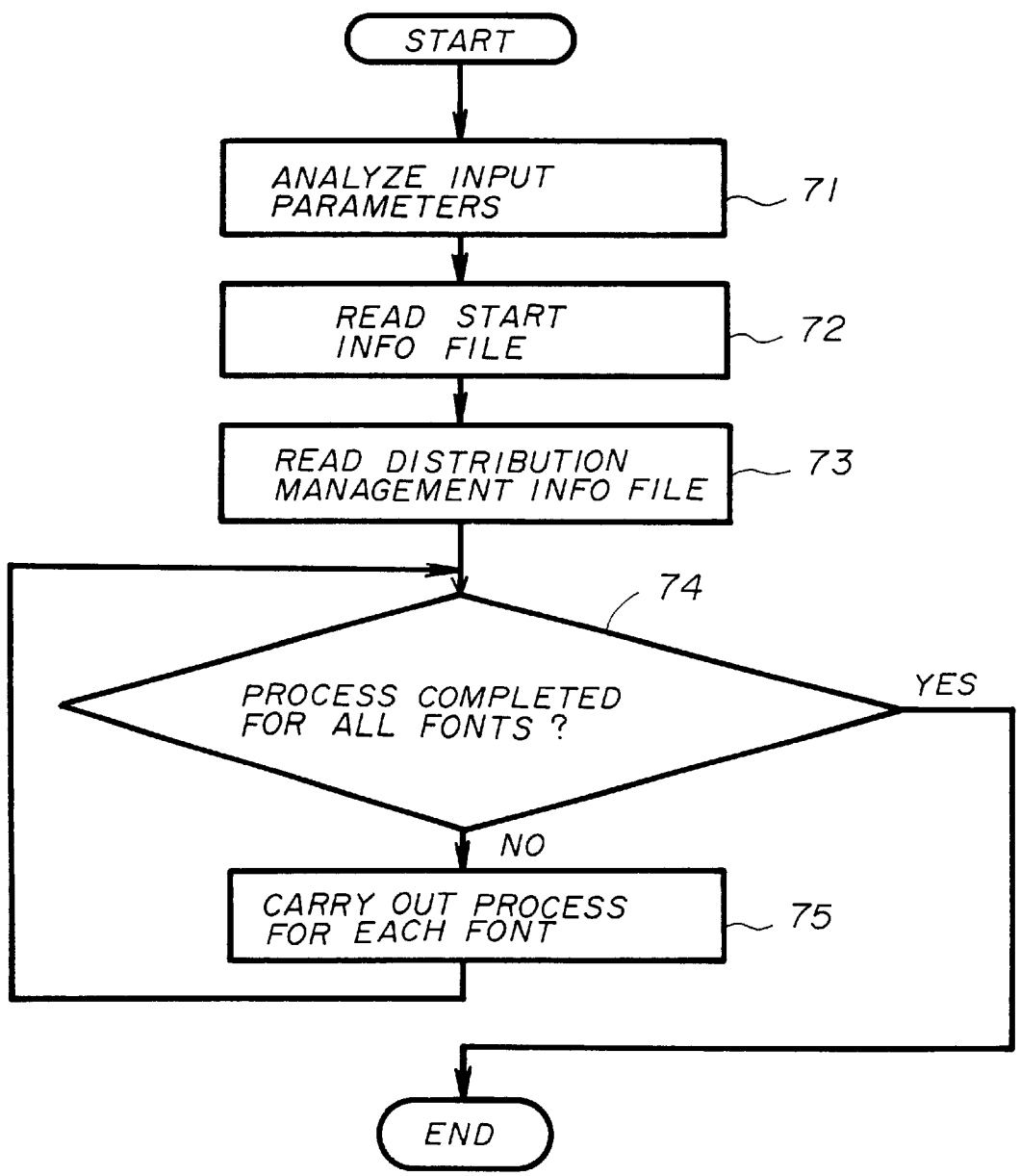
FIG. 13 is a flow chart for explaining a process of managing business nonstandard characters at the client.

Next, a description will be given of the process of managing the nonstandard characters for each work at the client 3, that is, the process of the nonstandard character registration program, by referring to FIG. 13. FIG. 13 is a flow chart for explaining the process of managing business nonstandard characters for each work at the client 3.

First, a step 71 shown in FIG. 13 analyzes the parameters specified at the start, and recognizes the work identification name. A step 72 extracts communication server information from the start information file 21 corresponding to the work identification name recognized by the step 71. Hence, the location of the file which stores the nonstandard characters to be used by the specified work is identified.

Then, a step 73 reads and stores a most recent distribution management information file 22 by making access to the communication server 2 based on the communication server information extracted by the step 72, and reads the number of nonstandard character fonts to be used by the specified work, the font identification name of each font, the distribution date and the difference applicable date from the read distribution management information file 22.

A step 74 decides whether or not the process is carried out with respect to all of the fonts to be used by the work, and the process ends if the decision result in the step 74 is YES. On the other hand, if the decision result in the step 74 is NO, a step 75 carries out the process for each font, and the process returns to the step 74.

Figure 14:
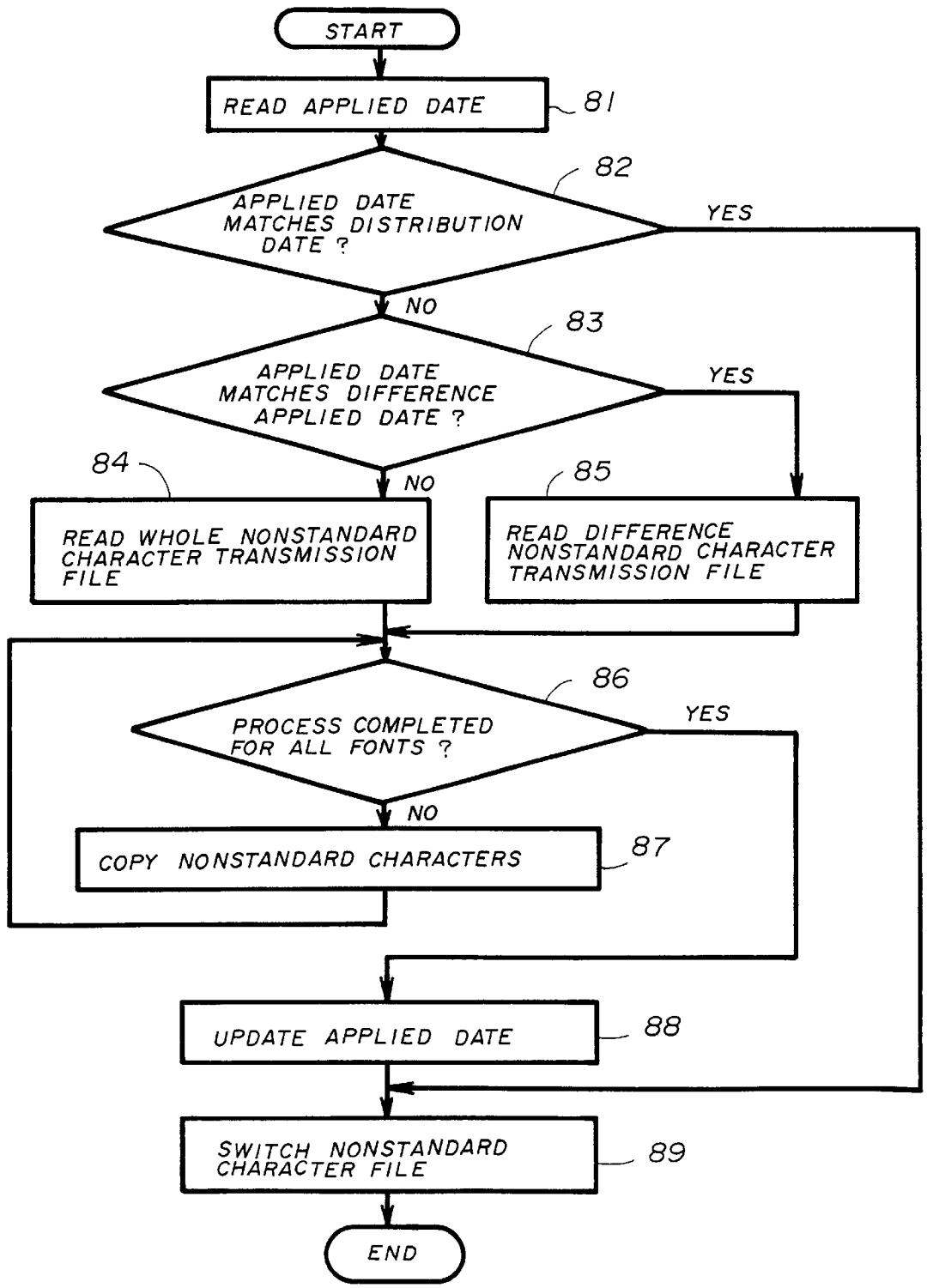
FIG. 14 is a flow chart for explaining a process of managing font nonstandard characters.

The process carried out for each font will now be described with reference to FIG. 14. FIG. 14 is a flow chart for explaining a process of managing font nonstandard characters.

First, a step 81 shown in FIG. 14 obtains an applied date of the font from an applied date information file 27 shown in FIG. 3 which is managed by the client 3. The applied date information file 27 manages the dates on which the nonstandard character transmission files which are downloaded from the communication server 2 for each work and for each font are applied at the client 3. The date on which the nonstandard character transmission file is applied corresponds to the date on which the contents of the nonstandard character file within the client 3 are updated based on the contents of the nonstandard character transmission file.

A step 82 compares the applied date managed by the client 3 and a distribution date within the distribution management information file 22, and decides whether or not the two dates match. If the decision result in the step 82 is YES, the font is already applied and there is not need to carry out a registration process with respect to this font, and thus, the process advances to a step 89 which will be described later. On the other hand, if the decision result in the step 82 is NO, it is necessary to carry out a registration process with respect to the font, and the process advances to a step 83.

The step 83 compares the applied date managed by the client 3 and a difference applied date within the distribution management information file 22, and decides whether or not the two dates match. If the decision result in the step 83 is YES, it is possible to update the nonstandard character information to the most recent information using only the difference nonstandard character transmission file 25 stored in the communication server 2, and a step 85 reads the difference nonstandard character transmission file 25 from the communication server 2. On the other hand, if the decision result in the step 83 is NO, it is not possible to update the nonstandard character information to the most recent information using only the difference nonstandard character transmission file 25 stored in the communication server 2, and a step 84 reads the whole nonstandard character transmission file 24 from the communication server 2.

Next, after the step 84 or 85, a step 86 decides whether or not the process is completed with respect to all nonstandard character data. If the decision result in the step 86 is NO, a step 87 writes the nonstandard character data with respect to all of the nonstandard characters within the whole nonstandard character transmission file 24 or the difference nonstandard character transmission file 25 into a registered nonstandard character file for the concerned font in the client 3, and the process returns to the step 86. On the other hand, if the decision result in the step 86 is YES, a step 88 updates the applied dates of the concerned work and the concerned font in the applied date information file 27.

Finally, after the step 88 or when the decision result in the step 82 is YES, the step 89 changes the correspondence of a system nonstandard character file with respect to the font. In other words, if the system nonstandard character file allocated for the concerned font is different from the nonstandard character file to which the nonstandard character is registered this time, the correspondence of the system nonstandard character file with respect to this font is changed.

If the above described process with respect to all of the fonts specified by the distribution management information is completed, the decision result in the step 74 shown in FIG. 13 becomes YES, and the process of the nonstandard character registration program ends.

By automatically starting or, manually starting by the operator, a business program corresponding to the work identification name which is specified as the parameter at the time of starting the nonstandard character registration program when the process of the nonstandard character registration program ends, it is possible to use the nonstandard characters which are required by the started business program.

The following modifications of the above described embodiment are possible.

Although FIG. 1 shows only one nonstandard character management server 1, one communication server 2 and one client 3, it is of course possible to provide a plurality of clients 3. In addition, it is of course possible to provide a plurality of nonstandard character management servers 1 and/or a plurality of communication servers 2. For example, it is possible to provide one nonstandard character management server 1 with respect to each work, and/or to provide one communication server 2 with respect to each work.

With respect to the file management carried out by the computer, it is possible to manage the date and hour instead of managing the difference applicable date, as long as the updated date and hour are managed. In this case, it is possible to update the nonstandard character file a plurality of times within the same date.

An update version number which indicates the number of times the updating is made may be added to the nonstandard character file. Similarly, the date and the number of times the updating is made on that date may be added to the nonstandard character file.

In the embodiment described above, the nonstandard character transmission file created by the nonstandard character management server 1 is once registered in the communication server 2, and the client 3 obtains the nonstandard character transmission file from the communication server 2. However, it is possible to omit the communication server 2, so that the client 3 obtains the nonstandard character transmission file directly from the nonstandard character management server 1.

Furthermore, instead of managing the difference nonstandard character transmission file 25 for only one generation, it is of course possible to manage the difference nonstandard character transmission files 25 for a plurality of generations.

In addition, as another application of the present invention, it is possible to use the present invention to expand the specifications of the Hyper Text Markup Language (HTML).

For example, by an instruction "<DICT ID=id HREF="url">", a HTML document display program automatically downloads a nonstandard character font specified by a work identification name id which is stored at a location (server name and its directory name) specified by url, so that the nonstandard characters included in a document subsequent to the DICT tag are displayed on the display unit 18 shown in FIG. 2.

Further, the present invention is not limited to these embodiments, but various variations and modifications may be made without departing from the scope of the present invention.

What is claimed is:

1. A nonstandard character processing apparatus comprising:

work processing parts carrying out processes each one using nonstandard characters registered in a system nonstandard character file, the nonstandard characters not included in a character set provided in the apparatus as standard characters;

mutually different nonstandard character files provided in correspondence with work identification information identifying each one of the processes, each nonstandard character file stores a set of the nonstandard characters used by each corresponding process; and a nonstandard character registration processing part registering in the system nonstandard character file the mutually different nonstandard character files in correspondence with the work identification information.

2. The nonstandard character processing apparatus as claimed in claim 1, which further comprises:

means for updating the nonstandard character files provided in correspondence with the work identification information.

3. The nonstandard character processing apparatus as claimed in claim 1, which further comprises:

means for obtaining nonstandard character updating information corresponding to the work identification information from a nonstandard character management server which stores the nonstandard character updating information in correspondence with the work identification information; and means for updating the nonstandard character file corresponding to the specified work identification information based on the nonstandard character updating information obtained from the nonstandard character management server.

4. A nonstandard character processing apparatus coupled to a nonstandard character management server apparatus which provides a whole nonstandard character transmission file, a difference nonstandard character transmission file and a distribution management information file, said whole nonstandard character transmission file storing all of most recent nonstandard character information, said difference nonstandard character transmission file storing a difference of nonstandard character information of one generation before and the most recent nonstandard character information, said distribution management information file storing dates of the most recent nonstandard character information and nonstandard character information of one generation before, said nonstandard character processing apparatus comprising:

a nonstandard character file provided within the nonstandard character processing apparatus, the nonstandard character file registering nonstandard character information not included in a character set provided in the apparatus as standard character information; and means for updating said nonstandard character file within the nonstandard character processing apparatus using one of said whole nonstandard character transmission file and said difference nonstandard character transmission file, based on a comparison result of a date of said nonstandard character file within the nonstandard character processing apparatus and a date stored in said distribution management information file within the nonstandard character management server.

5. A nonstandard character processing apparatus coupled to a nonstandard character management server which provides a nonstandard character transmission file and a distribution management information file, said nonstandard transmission file storing most recent nonstandard character information, said distribution management information file storing a date of the most recent nonstandard character information, said nonstandard character processing apparatus comprising:

a nonstandard character file provided within the nonstandard character processing apparatus, the nonstandard character file registering nonstandard character information not included in a character set provided in the apparatus as standard character information; and means for updating said nonstandard character file of the nonstandard character processing apparatus using said nonstandard character transmission file when a date of said nonstandard character file of the nonstandard character processing apparatus and a date stored in said distribution management information file do not match.

6. A nonstandard character processing apparatus comprising:

downloading means for downloading mutually different nonstandard character files corresponding to work identification information identifying works, each nonstandard character file stores a set of nonstandard characters used by each corresponding work and each nonstandard character file specified in each work with a tag which specifies the nonstandard character file and information related to a storage location of the nonstandard character file;

displaying means for processing each work and displaying nonstandard characters appearing subsequent to the tag by use of the nonstandard character file which is downloaded by said downloading means, the nonstandard characters not included in a character set provided in the apparatus as standard characters.

7. A nonstandard character processing apparatus, comprising:

downloading means for downloading nonstandard character files corresponding to work identification information identifying documents, each nonstandard character file stores a set of nonstandard characters used by each corresponding document and each nonstandard character file specified in each document with a tag which specifies the nonstandard character file and information related to a storage location of the nonstandard character file; and displaying means for processing each document and displaying nonstandard characters appearing subsequent to the tag by use of the nonstandard character file which is downloaded by said downloading means, said document being a Hyper Text Markup Language (HTML) document and the nonstandard characters not included in a character set provided in the apparatus as standard characters.

8. A nonstandard character processing system comprising:

a nonstandard character management server comprising:

a whole nonstandard character transmission file storing all of most recent nonstandard character information;

a difference nonstandard character transmission file storing a difference of nonstandard character information of one generation before and the most recent nonstandard character information; and a distribution management information file storing dates of the most recent nonstandard character information and the nonstandard character information of one generation before, the nonstandard character information not included in a character set provided in a client as standard character information; and said client apparatus, coupled to said nonstandard character management server, comprising:

a nonstandard character file provided within the client apparatus, the nonstandard character file registering nonstandard character information not included in a character set provided in the client as standard character information; and means for updating the nonstandard character file within the nonstandard character management server using one of the whole nonstandard character transmission file and the difference nonstandard character transmission file, based on a comparison result of a date of the nonstandard character file within the client apparatus and a date stored in the distribution management information file within the nonstandard character management server.

9. A computer readable storage medium which stores a program readable by a computer, comprising:

means for causing the computer to carry out processes using nonstandard characters corresponding to each one of the processes and registered in a system nonstandard character file, the nonstandard characters not included in a character set provided in the computer as standard characters;

means for causing the computer to provide mutually different nonstandard character files in correspondence with work identification information identifying each one of the processes, each nonstandard character file stores a set of the nonstandard characters used by each corresponding process; and means for causing the computer to register in the system nonstandard character file the mutually different nonstandard character files in correspondence with the work identification information.

10. The computer readable storage medium as claimed in claim 9, which further comprises:

means for causing the computer to update the nonstandard character files provided in correspondence with the specified work identification information.

11. The computer readable storage medium as claimed in claim 9, which further comprises:

means for causing the computer to contain nonstandard character updating information corresponding to the work identification information from a nonstandard character management server which stores the nonstandard character updating information in correspondence with the work identification information; and means for causing the computer to update the nonstandard character file corresponding to the specified work identification information based on the nonstandard character updating information obtained from the nonstandard character management server.

12. A computer readable storage medium storing a program readable by a computer, said computer being coupled to a nonstandard character management server apparatus which provides a whole nonstandard character transmission file, a difference nonstandard character transmission file and a distribution management information file, said whole nonstandard character transmission file storing all of most recent nonstandard character information, said difference nonstandard character transmission file storing a difference of nonstandard character information of one generation before and the most recent nonstandard character information, said distribution management information file storing dates of the most recent nonstandard character information and the nonstandard character information of one generation before, said computer readable storage medium comprising:

means for causing the computer to provide a nonstandard character file, the nonstandard character file registering nonstandard character information not included in a character set provided in the apparatus as standard character information; and means for causing the computer to update said nonstandard character file within the computer readable storage medium using one of said whole nonstandard character transmission file and said difference nonstandard character transmission file, based on a comparison result of a date of said nonstandard character file within the computer readable storage medium and a date stored in said distribution management information file within the nonstandard character management server.

13. A computer readable storage medium storing a program readable by a computer which is coupled to a nonstandard character management server which provides a nonstandard character transmission file and a distribution management information file, said nonstandard transmission file storing most recent nonstandard character information, said distribution management information file storing a date of the most recent nonstandard character information said computer readable storage medium comprising:

means for causing the computer to provide a nonstandard character file, the nonstandard character file registering nonstandard character information not included in a character set provided in the apparatus as standard character information; and means for causing the computer to update said nonstandard character file of the computer readable storage medium using said nonstandard character transmission file when a date of said nonstandard character file of the computer readable storage medium and a date stored in said distribution management information file do not match.

14. A computer readable storage medium storing a program readable by a computer, comprising:

downloading means for causing the computer to download nonstandard character files based on corresponding work identification information identifying works, each nonstandard character file storing a set of nonstandard characters used by each corresponding work and each nonstandard character file specified in each work with a tag which specifies the nonstandard character file and information related to a storage location of the nonstandard character file; and displaying means for causing the computer to display nonstandard characters appearing subsequent to the tag by use of the nonstandard character file which is downloaded by said downloading means, the nonstandard characters not included in a character set provided in the computer as standard characters.

15. The computer readable storage medium as claimed in claim 14, wherein said displaying means causes the computer to display a Hyper Text Markup Language (HTML) document.

16. A system for processing works using nonstandard characters, comprising:

a network;

a computer connected to the network and configured to process works using nonstandard characters, the nonstandard characters not included in a character set provided in the computer as standard characters;

a computer connected to the network, the computer having a storage unit and configured to store nonstandard character files containing the nonstandard characters, each nonstandard character file corresponding to each work; and a computer connected to the network and configured to register which nonstandard character files correspond to which work to use the nonstandard characters.

17. A system for processing works using nonstandard characters, comprising:

a network;

a computer connected to the network and configured to process works, each work using nonstandard characters, the nonstandard characters not included in a character set provided in the computer as standard characters; and a computer connected to the network and configured to create nonstandard character files containing the nonstandard characters, to store the nonstandard character files in a storage unit of the computer and to register which nonstandard character files correspond to which work to use the nonstandard characters.

* * * * *